(12) United States Patent
Liang et al.

(10) Patent No.: US 9,826,501 B2
(45) Date of Patent: Nov. 21, 2017

(54) PAGING METHOD, APPARATUS, AND SYSTEM

(71) Applicant: China Academy of Telecommunications Technology, Beijing (CN)

(72) Inventors: Jing Liang, Beijing (CN); Dong Chen, Beijing (CN); Ying Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/781,999

(22) PCT Filed: Apr. 1, 2014

(86) PCT No.: PCT/CN2014/074535
§ 371 (c)(1),
(2) Date: Oct. 2, 2015

(87) PCT Pub. No.: WO2014/161472
PCT Pub. Date: Oct. 9, 2014

(65) Prior Publication Data
US 2016/0044632 A1 Feb. 11, 2016

(30) Foreign Application Priority Data
Apr. 2, 2013 (CN) .......................... 2013 1 0112988

(51) Int. Cl.
*H04W 68/02* (2009.01)
*H04W 52/02* (2009.01)
(Continued)

(52) U.S. Cl.
CPC ......... *H04W 68/02* (2013.01); *H04M 11/022* (2013.01); *H04W 8/26* (2013.01);
(Continued)

(58) Field of Classification Search
CPC .... H04W 52/02; H04W 76/048; H04W 68/00
See application file for complete search history.

(56) References Cited

U.S. PATENT DOCUMENTS

2010/0267366 A1 10/2010 Du
2013/0003629 A1 1/2013 Jeong et al.
(Continued)

FOREIGN PATENT DOCUMENTS

CN 102257859 A 11/2011
CN 102469585 A 5/2012
(Continued)

OTHER PUBLICATIONS

International Search Report of PCT/CN2014/074535 dated Jun. 30, 2014, 4 pages.
(Continued)

*Primary Examiner* — Diane Mizrahi
(74) *Attorney, Agent, or Firm* — Kilpatrick Townsend & Stockton LLP

(57) ABSTRACT

Disclosed are a paging method, apparatus, and system, used for solving the problems in the prior art of long time lapse and low paging reception reliability in terminals when using an extended DRX cycle to carry out monitoring. The method in the embodiments of this invention comprises: a terminal performs paging reception in an extended paging location within each extended paging cycle; and within at least one extended paging cycle, the terminal performs paging retransmission reception in at least one specific paging location other than the extended paging location. As the terminal performs paging reception at least twice within at least one extended paging cycle, the embodiments of the present invention may improve terminal power-saving and also ensure the time lapse and reliability of paging reception,
(Continued)

thereby achieving the aims of assuring user experience and improving system performance.

10 Claims, 6 Drawing Sheets

(51) Int. Cl.
| | | |
|---|---|---|
| H04M 11/02 | (2006.01) | |
| H04W 8/26 | (2009.01) | |
| H04W 72/06 | (2009.01) | |
| H04W 76/04 | (2009.01) | |
| H04W 68/00 | (2009.01) | |
| H04W 84/02 | (2009.01) | |
| H04W 88/02 | (2009.01) | |
| H04W 88/08 | (2009.01) | |

(52) U.S. Cl.
CPC ... *H04W 52/0216* (2013.01); *H04W 52/0229* (2013.01); *H04W 72/06* (2013.01); *H04W 68/005* (2013.01); *H04W 76/048* (2013.01); *H04W 84/02* (2013.01); *H04W 88/02* (2013.01); *H04W 88/08* (2013.01); *Y02B 60/50* (2013.01)

(56) References Cited

U.S. PATENT DOCUMENTS

| | | | | |
|---|---|---|---|---|
| 2015/0341978 A1* | 11/2015 | Rune | ............ | H04W 76/048 370/254 |
| 2016/0029344 A1* | 1/2016 | Vannithamby | ........ | H04W 76/00 455/458 |
| 2016/0029434 A1* | 1/2016 | Qiu | ............ | H04W 4/005 370/311 |
| 2016/0081022 A1* | 3/2016 | Haneji | ............ | H04W 52/0229 370/311 |

FOREIGN PATENT DOCUMENTS

| | | |
|---|---|---|
| CN | 102783221 A | 11/2012 |
| WO | 2012091441 A2 | 7/2012 |

OTHER PUBLICATIONS

Samsung: "How the UE decides to initiate low power mode?", 3GPP Draft; S2-130136 UEPCOP Factors for Longer DRX, 3rd Generation Partnership Project (3GPP), Mobile Competence Centre; 650, Route Des Lucioles; F-06921 Sophia-Antipolis Cedex ; France, vol. SA WG2, no. Prague, Czech Republic; Jan. 28, 2013-Feb. 1, 2013 Jan. 21, 2813 (Jan. 21, 2013), XP050684622, Retrieved from the Internet: URL:http://www.3gpp.org/ftp/tsg_sa/WG2_Arch/TSGS2_95_Prague/Docs/[retrieved on Jan. 21, 2013].

CATT: "Mix Normal and Extended DRX Cycles", 3GPP Draft; R2-131000 Mix Normal and Extended DRX Cycles, 3rd Generation Partnership Project (3GPP), Mobile Competence Centre; 658, Route Des Lucioles; F-06921 Sophia-Antipolis Cedex; France, vol. RAN WG2, no. Chicago, USA; Apr. 15, 2013-Apr. 19, 2013 Apr. 5, 2013 (Apr. 5, 2013), XP050699205, Retrieved from the Internet: URL:http://www.3gpp.org/ftp/tsg_ran/WG2_RL2/TSGR2_81bis/Docs/[retrieved on Apr. 5, 2013].

The Extended European Search Report issued on Mar. 8, 2016 in the EP counterpart application (14778398.9).

\* cited by examiner

PAGING METHOD, APPARATUS, AND SYSTEM

This application is a U.S. National Stage of International Application No. PCT/CN2014/074535, filed Apr. 1, 2014, designating the United States, and claiming the benefit of Chinese Patent Application No. 201310112988.6, filed with the State Intellectual Property Office of People's Republic of China on Apr. 2, 2013 and entitled "Paging Method, Apparatus, and System", the content of which is hereby incorporated by reference in its entirety.

FIELD

The present invention relates to the field of wireless communications and particularly to a paging method, device and system.

BACKGROUND

From the perspective of the radio network side, there are two states, i.e., the RRC_connected state and the RRC_idle state, of a UE in a Long Term Evolution (LTE) system; and there are five states, i.e., cell_dch, cell_fach, cell_pch/ura_pch, and idle states, of a UE in a Universal Mobile Telecommunication System (UMTS), where cell_dch, cell_fach and cell_pch/ura_pch belong to the RRC_connected state. Only the UE in the RRC_connected state can transmit uplink data. Once the UE transmits all of uplink data, the network side releases the Radio Resource Control (RRC) connection of the UE in an RRC Connection Release message upon detecting that the UE has no data transmitted for a long period of time, so that the UE enters the RRC_idle state.

The UE in the idle state primarily operates to monitor paging from the network side. In order to save power, the UE generally monitors paging in a Discontinuous Reception (DRX) mode in which the UE receives only for a short period of time in each cycle but does not receive in the remaining period of time in the cycle, as illustrated in FIG. 1. In the UMTS system, the length of time of a DRX cycle configured at the network side at present is at most $2^9$ radio frames (i.e. 5120 ms), that is, from the perspective of DRX in the UMTS system, the UE enables a receiver at most once every 5120 ms to receive a paging instruction message, and possibly a paging message, from the network side, but disables the receiver in the remaining period of time. The longest DRX cycle configured at the network side at present in the LTE system is 2560 ms.

There are possibly two DRX cycle lengths configured for the UE in both the UMTS system and the LTE system. One is configured by a Radio Network Controller (RNC)/evolved Node B (eNB) in a System Information Block (SIB) message and can be referred to a default DRX, which is applicable to all of UEs residing in the cell; and the other DRX is negotiated about by a Core Network (CN) entity and the UE in a Non-Access Stratum (NAS) procedure and can be referred to a UE specific DRX, which is only applicable to a single UE. The latter DRX length is unknown to the RNC/eNB in the negotiation procedure of the CN entity and the UE. The UE monitors a paging message at the shorter one of the two DRX cycles.

The paging procedure is initiated by the CN entity firstly transmitting the paging message to the RNC (UMTS)/eNB (LTE). The paging message is transmitted by a Mobility Management Entity (MME) to the eNB via an S1 interface in the LTE system, as illustrated in FIG. 2; and transmitted via an Iu interface in the UMTS system, as illustrated in FIG. 3. If the paging message carries the UE specific DRX configuration, then the RNC will transmit the paging message via the air interface using a DRX parameter configured in the paging message in the UMTS system. The eNB will compare the DRX parameter in the DRX configuration with a DRX parameter configured in a system message and transmit the paging message at the shorter one of the DRX cycles in the LTE system.

Calculation of a occasion at which the UE receives paging is related directly to a System Frame Number (SFN) and an International Mobile Subscriber Identity (IMSI). Particularly a occasion at which the UE receives paging can be calculated as specified in the 3GPP TS 36.304 protocol in the LTE system; and a occasion at which the UE receives paging can be calculated as specified in the 3GPP TS 25.304 protocol in the UMTS system.

Machine-Type Communication (MTC), which is a new communication idea, is intended to integrate a number of different types of communication technologies together, e.g., machine-to-machine communication, machine controlled communication, human-to-machine interactive communication, mobile Internet communication, etc., to thereby develop social production and life styles. As expected, human-to-human communication services will account for only one third of the UE markets in the future, whereas a larger amount of communication will emerge as MTC communication services. Sometimes MTC communication is also referred to as Machine-to-Machine (M2M) communication or the Internet of Things.

An important issue of power saving needs to be considered in an MTC communication scenario. In some scenarios, the lifetime of an MTC device is determined directly by the lifetime of a battery, for example, an MTC device for tracking an animal or an MTC device for hydrologic supervision, for both of which it is nearly impossible to replace their batteries, so the MTC device is required to consume an extremely low amount of power. A longer DRX cycle needs to be applied to the MTC device for more power saving. Thus the DRX cycle specified in the existing protocols (2.56 seconds in the LTE system, and 5.12 seconds in the UMTS system) needs to be extended to an order of a minute and even an hour.

However if the UE monitors in the extended DRX cycle, then some problem may occur, for example, there may be a longer delay in receiving paging due to a longer interval of time between two paging occasions; and in another example, if some paging initiated by the network side is not received by the UE due to a limited resource, a poor channel quality, or another reason, then the UE has to wait for a longer period of time (which is the extended DRX cycle) to receive next paging, thus degrading the reliability of receiving the paging.

In summary, if the UE monitors in the extended DRX cycle in the prior art, then there may be a longer delay in receiving paging, and degraded reliability of receiving the paging.

SUMMARY

Embodiments of the invention provide a paging method, device and system so as to address such a problem in the prior art that if a UE monitors in an extended DRX cycle, then there may be a longer delay, and degraded reliability of receiving paging.

An embodiment of the invention provides a paging method of a user equipment (UE), the method including:

receiving, by the UE, paging at an extended paging occasion in each extended paging cycle; and receiving, by the UE, paging retransmission at one or more specific paging occasions other than the extended paging occasion in at least one extended paging cycle.

An embodiment of the invention provides a paging method of a base station, the method including:

transmitting, by the base station, paging at an extended paging occasion in each extended paging cycle; and retransmitting, by the base station, the paging at one or more specific paging occasions other than the extended paging occasion in at least one extended paging cycle.

An embodiment of the invention provides a user equipment (UE) including:

a first receiving module configured to receive paging at an extended paging occasion in each extended paging cycle; and a second receiving module configured to receive paging retransmission at one or more specific paging occasions other than the extended paging occasion in at least one extended paging cycle.

An embodiment of the invention provides a base station including:

a first transmitting module configured to transmit paging at an extended paging occasion in each extended paging cycle; and a second transmitting module configured to retransmit the paging at one or more specific paging occasions other than the extended paging occasion in at least one extended paging cycle.

An embodiment of the invention provides a communication system including:

a base station configured to transmit paging at an extended paging occasion in each extended paging cycle; and to retransmit the paging at one or more specific paging occasions other than the extended paging occasion in at least one extended paging cycle; and a UE configured to receive paging at the extended paging occasion in each extended paging cycle; and to receive paging retransmission at the at least one specific paging occasions other than the extended paging occasion in the at least one extended paging cycle.

In the embodiments of the invention, a UE receives paging at an extended paging occasion in each extended paging cycle; and the UE receives paging retransmission at one or more specific paging occasions other than the extended paging occasion in at least one extended paging cycle. Since the UE receives paging at least twice in the at least one extended paging cycle, a delay in and the reliability of receiving the paging can be guaranteed while improving a power-saving effect of the UE to thereby guarantee the experience of a user and improve the performance of the system.

DETAILED DESCRIPTION OF THE EMBODIMENTS

A UE in embodiments of the invention receives paging at an extended paging occasion in each extended paging cycle; and the UE receives paging retransmission at one or more specific paging occasions other than the extended paging occasion in at least one extended paging cycle. A delay in and the reliability of receiving the paging can be guaranteed while improving a power-saving effect of the UE.

The embodiments of the invention will be described below in further details with reference to the drawings. In the following description, firstly an implementation with cooperation of the base station side and the UE side will be described, and then implementations at the base station side and the UE side will be described respectively, but this will not suggest required cooperation of both the sides for an implementation, and in fact, problems encountered respectively at the base station side and the UE side will also be addressed in the separate implementations at the base station side and the UE side, although a better technical effect can be achieved in the implementation with cooperation of both the sides.

It shall be noted that a base station in the embodiments of the invention is an eNB in an LTE system; and the base station in the embodiments of the invention is an RNC or a Node B in a UMTS system.

Figure 1:
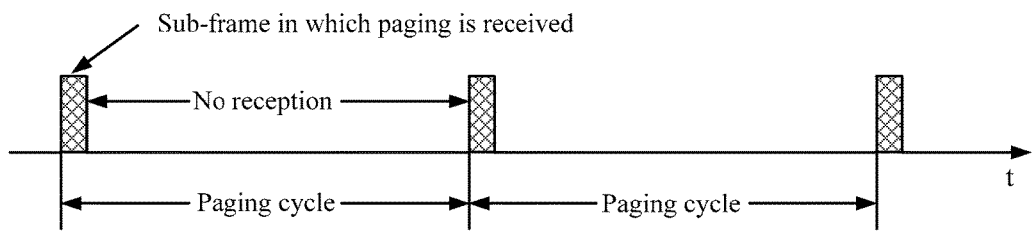
FIG. 1 illustrates a schematic diagram of receiving paging by the UE in the DRX mode in the prior art.
Figure 2:
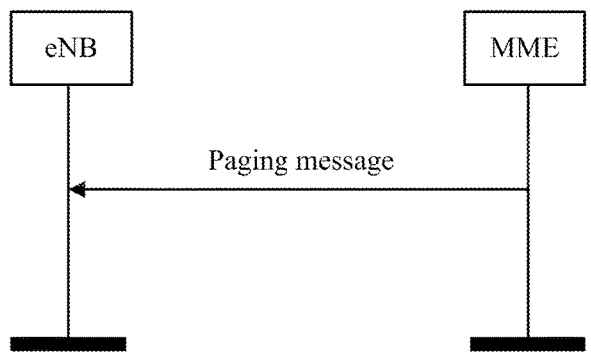
FIG. 2 illustrates a schematic diagram of transmission of the paging message via the interface in the LTE system in the prior art.
Figure 3:
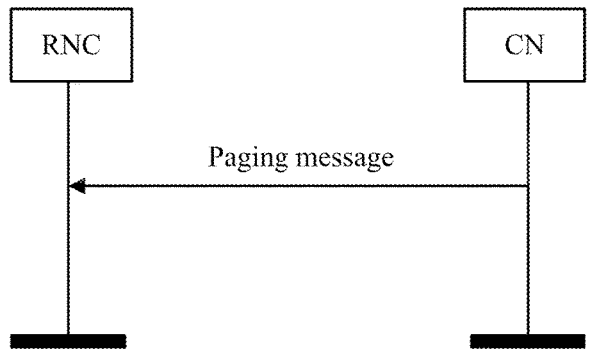
FIG. 3 illustrates a schematic diagram of transmission of the paging message via the interface in the UMTS system in the prior art.
Figure 4:
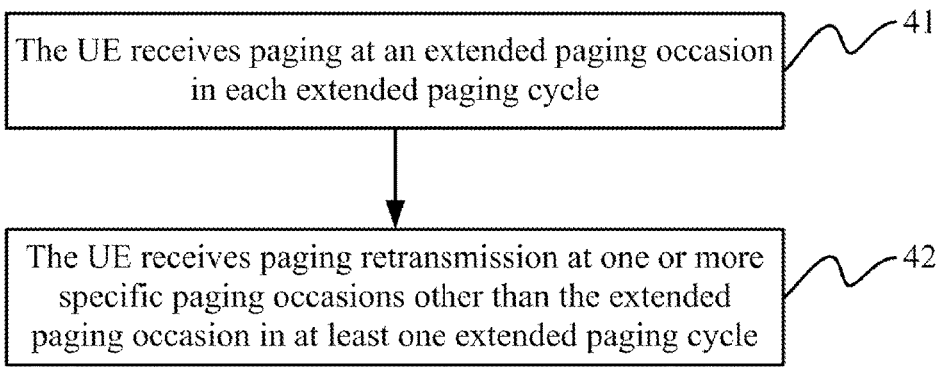
FIG. 4 illustrates a schematic flow chart of a paging method of a UE according to an embodiment of the invention.

Referring to FIG. 4, a paging method of a UE according to an embodiment of the invention includes the following steps:

In the operation 41, a UE receives paging at an extended paging occasion in each extended paging cycle; and In the operation 42, the UE receives paging retransmission at one or more specific paging occasions other than the extended paging occasion in at least one extended paging cycle.

The extended paging cycle in the embodiment of the invention is longer than a traditional DRX cycle;

Preferably the extended paging cycle is an integer multiple of the traditional DRX cycle;

Here the traditional DRX cycle includes a default DRX cycle, and a UE specific DRX cycle.

For example, if the longest DRX cycle which can be configured by the network side in the LTE system is 2.56 seconds, then the extended paging cycle may be longer than 2.56 seconds, e.g., 20.48 seconds, for more power saving.

It shall be noted that although the embodiment of the invention is described taking the extended paging cycle of 20.48 seconds as an example, the extended paging cycle in the embodiment of the invention will not be limited to 20.48 seconds, but the extended paging cycle can be any cycle longer than the traditional DRX cycle, and the extended paging cycle in the embodiment of the invention can be extended to an order of minutes and even hours.

In the embodiment of the invention, the UE receives paging at least twice in the least one extended paging cycle, and since the extended paging cycle is far longer than the existing DRX cycle, a delay in and the reliability of receiving the paging can be guaranteed to some extent while improving the effect of power-saving of the UE to thereby guarantee the experience of a user and improve the performance of the system.

In an implementation, the UE decides to receive paging at the extended paging cycle, after negotiating with a core network device; meanwhile, the base station also transmit paging at the extended paging cycle.

Here the core network device is an MME or a Serving General Packet Radio System (GPRS) Support Node (SGSN).

Furthermore the UE determines the extended paging occasion at which paging is received, in the following operations:

The UE determines a paging frame in which paging is received in each extended paging cycle, according to preset extended paging parameters; and The UE determines a paging sub-frame in which paging is received in the paging frame, according to the extended paging parameters.

Here the extended paging parameters include at least the extended paging cycle and an extended paging density.

Particularly the UE determines the extended paging occasion at which paging is received, according to the extended paging cycle, the extended paging density, and its own UE ID (e.g., IMSI).

It shall be noted that if the UE and the base station perform the paging procedure at the extended paging cycle in a DRX mode, then paging will be performed once by default in each extended paging cycle (that is, the number of times for extended paging is 1 by default); and if paging needs to be performed twice or more in each extended paging cycle, then a preset number of times for extended paging shall be further carried among the extended paging parameters.

Preferably the extended paging parameters further include the number of times for extended paging.

Correspondingly the base station determines the extended paging occasion at which paging is transmitted, in the following operations:

The base station determines a paging frame in which it transmits paging in each extended paging cycle, according to preset extended paging parameters; and The base station determines a paging sub-frame in which paging is transmitted in the paging frame, according to the extended paging parameters.

Particularly the base station determines the extended paging occasion at which paging is transmitted, according to the extended paging cycle, the extended paging density, and the UE ID (e.g., the IMSI).

Preferably the extended paging parameters further include the number of times for extended paging.

After the base station and the UE determine the extended paging occasion, the base station transmits paging at the extended paging occasion in each extended paging cycle, and correspondingly the UE receives paging at the extended paging occasion in each extended paging cycle, thus paging is performed in the extended paging cycle.

It shall be noted that the extended paging occasion can be determined in the same way that the paging occasion is determined for paging in the DRX mode in the prior art. Particularly the extended paging occasion can be calculated as specified in the 3GPP TS 36.304 protocol in the LTE system; and the extended paging occasion can be calculated as specified in the 3GPP TS 25.304 protocol in the UMTS system.

In an implementation, the UE determines the specific paging occasion or occasions in the following operations:

The UE determines a paging retransmission frame in which paging retransmission is received in each extended paging cycle, according to specific paging parameters corresponding to paging retransmission; and The UE determines a paging retransmission sub-frame in which paging retransmission is received in the paging retransmission frame according to the specific paging parameters.

Here the specific paging parameters include at least a specific paging cycle and a specific paging density.

It shall be noted that the number of times for specific paging is 1 by default, and if paging needs to be retransmitted twice or more in each extended paging cycle, then the number of times for specific paging shall be further carried among the specific paging parameters.

Preferably the specific paging parameters further include the number of times for specific paging.

It shall be noted that the specific paging occasion or occasions can be determined in the same way that the paging occasion is determined for paging in the DRX mode in the prior art. Particularly the specific paging occasion or occasions can be calculated as specified in the 3GPP TS 36.304 protocol in the LTE system; and the specific paging occasion or occasions can be calculated as specified in the 3GPP TS 25.304 protocol in the UMTS system.

Preferably the specific paging parameters can be default paging parameters defined in the 3GPP protocol, or can be newly defined paging retransmission parameters for only paging retransmission, where the paging retransmission parameters are different from the default paging parameters.

In an implementation, the default paging parameters include at least a default paging cycle and a default paging density;

Furthermore since the number of times for default paging is 1 by default, if the number of times for default paging is more than 1, then preferably the default paging parameters further include the number of times for default paging.

In an implementation, the paging retransmission parameters include at least a paging transmission cycle and a paging retransmission density;

Furthermore since the number of times for paging retransmission is 1 by default, if the number of times for paging retransmission is more than 1, then preferably the paging retransmission parameters further include the number of times for paging retransmission.

Furthermore the UE obtains the specific paging parameters as follows:

The UE receives system information transmitted by the base station at any instance of time before the extended paging occasion in the at least one extended paging cycle, and stores the specific paging parameters carried in the system information.

Particularly the base station transmits the system information to the UE in a broadcast transmission manner, where the system information carries the specific paging parameters.

In order to guarantee the reliability of paging retransmission, preferably the UE receives the system information transmitted by the base station at any instance of time before the extended paging occasion in each extended paging cycle, and stores the specific paging parameters carried in the system information.

Preferably the UE determines whether the specific paging parameters carried in the system information are the same as its currently stored specific paging parameters upon reception of the system information transmitted by the base station; and If so, then the UE will not update its currently stored specific paging parameters;

Otherwise, the UE stores the specific paging parameters carried in the system information to update its currently stored specific paging parameters.

In an implementation, if the extended paging cycle is longer than a System Frame Number (SFN) cycle, for example, the extended paging cycle is M times (where M represents a positive integer more than 2) the SFN cycle, then paging will be retransmitted at least once in each SFN cycle in each extended paging cycle;

Here the SFN cycle is a repeat cycle of a system frame number, and the repeat cycle of the system frame number is 1024 in the physical layer protocol in the LTE system, so the value of each radio frame number ranges from 0 to 1023, that is, each SFN cycle is 10.24 seconds in the LTE system.

By way of an example, if the extended paging cycle is 40.93 seconds, and the SFN cycle is 10.24 seconds, in the LTE system, then if a paging retransmission occasion determined from the specific paging parameters is the sub-frame #2 in the first radio frame in each SFN cycle, then paging will be retransmitted for four times in an extended paging cycle.

Further to the scenario above, in order for more power saving, preferably the operation 42 further includes:

The UE receives paging retransmission at the one or more specific paging occasions in a specified SFN cycle in the at least one extended paging cycle.

Correspondingly the base station retransmits the paging at the one or more specific paging occasions in a specified SFN cycle in the at least one extended paging cycle.

Preferably the specified SFN cycle can be prescribed by the UE and the base station, or can be determined and then notified by the base station to the UE.

For example, the UE and the base station prescribe that paging is retransmitted in a next SFN cycle after the extended paging occasion; and in another example, the UE and the base station prescribe that paging is retransmitted in any SFN cycle after the extended paging cycle.

In an implementation, if the specific paging cycle is shorter than the SFN cycle, then if the SFN cycle is N times (where N represents a positive integer more than 2) the specific paging cycle, then there may be at least two specific paging occasions determined from the specific paging parameters, that is, paging will be retransmitted at least twice in each SFN cycle.

By way of an example, if the SFN cycle is 10.24 seconds, and the default DRX cycle is 2.56 seconds, in the LTE system, then there will be four specific paging occasions determined from the default paging parameters in an SFN cycle, that is, paging will be retransmitted for at least four times in an SFN cycle.

Further to the scenario above, in order for more power saving, preferably the operation 42 further includes:

The UE receives paging retransmission at a specified specific paging occasion in the at least one extended paging cycle.

Correspondingly the base station retransmits the paging at a specified specific paging occasion in the at least one extended paging cycle.

Preferably the specified specific paging occasion can be prescribed by the UE and the base station, or can be determined and then notified by the base station to the UE.

In order for more power saving, in an implementation, the UE receives no paging retransmission by default but will receive paging retransmission only upon reception of an instruction of the base station, particularly as follows:

If the UE receives first instruction information transmitted by the base station in any extended paging cycle, then the UE receives paging retransmission at the one or more specific paging occasion in the current extended paging cycle and each subsequent extended paging cycle.

Here the base station can transmit the first instruction information at the extended paging occasion in the extended paging cycle, and correspondingly the UE receives the first instruction information at the extended paging occasion in the extended paging cycle; or the base station can transmit the first instruction information in the other sub-frame than the extended paging occasion in the extended paging cycle, and correspondingly the UE can receive the first instruction information in the other sub-frame than the extended paging occasion in the extended paging cycle.

In order to reduce the number of times that the UE is awoken, preferably the base station transmits the first instruction information at the extended paging occasion in the extended paging cycle.

Furthermore if the UE receives the second instruction information transmitted by the base station in any extended paging cycle, then the UE stops paging retransmission from being received in the current extended paging cycle and each subsequent extended paging cycle.

Here the base station can transmit the second instruction information at the extended paging occasion in the extended paging cycle, and correspondingly the UE receives the second instruction information at the extended paging occasion in the extended paging cycle; or the base station can transmit the second instruction information in the other sub-frame than the extended paging occasion in the extended paging cycle, and correspondingly the UE can receive the second instruction information in the other sub-frame than the extended paging occasion in the extended paging cycle.

In order to reduce the number of times that the UE is awoken, preferably the base station transmits the second instruction information at the extended paging occasion in the extended paging cycle.

In another implementation, the UE receives paging retransmission by default, and stops paging retransmission from being received, upon reception of an instruction of the base station, particularly as follows:

If the UE receives the second instruction information transmitted by the base station in any extended paging cycle, then the UE stops paging retransmission from being received in the current extended paging cycle and each subsequent extended paging cycle.

Here the base station can transmit the second instruction information at the extended paging occasion in the extended paging cycle, and correspondingly the UE receives the second instruction information at the extended paging occasion in the extended paging cycle; or the base station can transmit the second instruction information in the other sub-frame than the extended paging occasion in the extended paging cycle, and correspondingly the UE can receive the second instruction information in the other sub-frame than the extended paging occasion in the extended paging cycle.

In order to reduce the number of times that the UE is awoken, preferably the base station transmits the second instruction information at the extended paging occasion in the extended paging cycle.

Particularly the UE receives no paging retransmission by default, and the UE will receive paging retransmission at the one or more specific paging occasions in the current extended paging cycle and each subsequent extended paging cycle only upon reception of the first instruction information transmitted by the base station; and if the UE receives the second instruction information transmitted by the base station at the extended paging occasion in some extended paging cycle, then the UE will stop paging retransmission from being received, in the current extended paging cycle and each subsequent extended paging cycle until the UE receives the first instruction information transmitted by the base station again.

Figure 5:
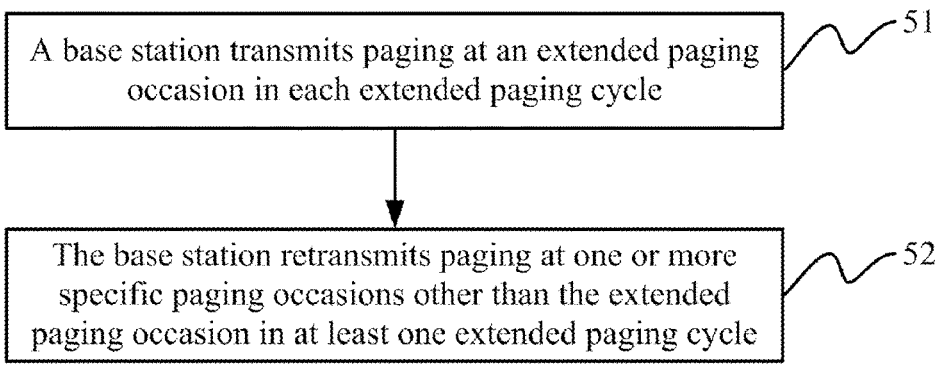
FIG. 5 illustrates a schematic flow chart of a paging method of a base station according to an embodiment of the invention.

Further to the embodiment above, referring to FIG. 5, an embodiment of the invention provides a paging method at the base station side, where the method includes the following operations:

In the operation 51, a base station transmits paging at an extended paging occasion in each extended paging cycle; and In the operation 52, the base station retransmits the paging at one or more specific paging occasions other than the extended paging occasion in at least one extended paging cycle.

The extended paging cycle in the embodiment of the invention is longer than a traditional DRX cycle, where the traditional DRX cycle includes a default DRX cycle, and a UE specific DRX cycle.

Preferably the extended paging cycle is an integer multiple of the traditional DRX cycle.

In an implementation, a core network device determines that paging is transmitted at the extended paging cycle, as a result of negotiation with a UE, and notifies the base station;

Here the core network device is an MME or an SGSN.

In an implementation, the base station determines the extended paging occasion in the following operations:

The base station determines a paging frame in which paging is transmitted in each extended paging cycle, according to preset extended paging parameters; and The base station determines a paging sub-frame in which paging is transmitted in the paging frame, according to the extended paging parameters.

Here the extended paging parameters include at least the extended paging cycle and an extended paging density.

Preferably the extended paging parameters further include the number of times for extended paging.

Furthermore the method further includes:

The base station determines specific paging parameters for paging retransmission, and notifies the UE of the specific paging parameters in system information;

Here the specific paging parameters include at least a specific paging cycle and a specific paging density.

Preferably the extended paging parameters further include the number of times for specific paging.

Particularly the base station transmits the system information to the UE in a broadcast transmission manner, where the system information carries the specific paging parameters.

Preferably the specific paging parameters are default paging parameters defined in the 3GPP protocol, or can be newly defined paging retransmission parameters for only paging retransmission.

In an implementation, the default paging parameters include at least a default paging cycle and a default paging density;

Preferably the default paging parameters further include the number of numbers for default paging.

In an implementation, the paging retransmission parameters include at least a paging retransmission cycle and a paging retransmission density;

Preferably the paging retransmission parameters further include the number of numbers for retransmitted paging.

In an implementation, the base station determines the specific paging occasion or occasions in the following operations:

The base station determines a paging retransmission frame in which the paging is retransmitted in each extended paging cycle, according to the specific paging parameters; and The base station determines a paging retransmission sub-frame in which the paging is retransmitted in the paging retransmission frame, according to the specific paging parameters.

In an implementation, if the extended paging cycle is longer than a System Frame Number (SFN) cycle, then:

The base station retransmits the paging at the at least one specific paging occasions in a specified SFN cycle in the extended paging cycle.

In an implementation, if the base station determines at least two specific paging occasions in each SFN cycle, then:

The base station retransmits the paging at a specified specific paging occasion in the at least one extended paging cycle.

For more power saving, the method further includes:

The base station determines whether to retransmit the paging, according to a preset determination criterion; and If it is determined that paging needs to be retransmitted, then the base station transmits first instruction information to the UE in the extended paging cycle, and retransmits the paging at the at least one specific paging occasion;

Here the first instruction information instructs the UE to receive paging retransmission at the at least one specific paging occasion in the current extended paging cycle and each subsequent extended paging cycle.

Particularly the base station can transmit the first instruction information at the extended paging occasion in the extended paging cycle, and correspondingly the UE can receive the first instruction information at the extended paging occasion in the extended paging cycle; or the base station can transmit the first instruction information in the other sub-frame than the extended paging occasion in the extended paging cycle, and correspondingly the UE can receive the first instruction information in the other sub-frame than the extended paging occasion in the extended paging cycle.

In order to reduce the number of times that the UE is awoken, preferably the base station transmits the first instruction information at the extended paging occasion in the extended paging cycle.

Furthermore the method further includes:

If it is determined that paging does not need to be retransmitted, then the base station transmits second instruction information to the UE in the extended paging cycle, and stops paging retransmission at the at least one specific paging occasion;

Where the second instruction information instructs the UE to stop paging retransmission from being received in the current extended paging cycle and each subsequent extended paging cycle.

Particularly the base station can transmit the second instruction information at the extended paging occasion in the extended paging cycle, and correspondingly the UE can receive the second instruction information at the extended paging occasion in the extended paging cycle; or the base station can transmit the second instruction information in the sub-frame other than the extended paging occasion in the extended paging cycle, and correspondingly the UE can receive the second instruction information in the other sub-frame than the extended paging occasion in the extended paging cycle.

In order to reduce the number of times that the UE is awoken, preferably the base station transmits the first instruction information at the extended paging occasion in the extended paging cycle.

In an implementation, the preset determination criterion includes one or more of criterions:

The base station determines whether to retransmit paging, according to the extended paging cycle;

The base station determines whether to retransmit paging, according to a current channel quality; and The base station determines whether to retransmit paging, according to a paging density of the current cell;

Here the channel quality includes one or more of Channel State Information (CSI), Reference Signal Received Power (RSRP), and Reference Signal Received Quality (RSRQ).

By way of an example, if the extended paging cycle is longer than a preset cycle threshold, then the base station determines that paging needs to be retransmitted, and transmits the first instruction information to the UE at the extended paging occasion to instruct the UE to receive paging retransmission at the at least one specific paging occasions in the current extended paging cycle and each subsequent extended paging cycle.

In another example, if the paging density of the current cell is no less than a preset paging density threshold, then the base station determines that paging needs to be retransmitted, and transmits the first instruction information to the UE at the extended paging occasion to instruct the UE to receive paging retransmission at the at least one specific paging occasions in the current extended paging cycle and each subsequent extended paging cycle; and if the paging density of the current cell is less than the preset paging density threshold at some instance of time, then the base station determines that paging retransmission needs to be stopped, and sends the second instruction information to the UE at the extended paging occasion to instruct the UE to stop paging retransmission from being received at the at least one specific paging occasion in the current extended paging cycle and each subsequent extended paging cycle.

In the embodiment of the invention, the base station is an eNB in the LTE system; and the base station is an RNC or a Node B in the UMTS system.

The paging methods according to the embodiments of the invention will be described below in details in connection with three particular embodiments.

Figure 6A:
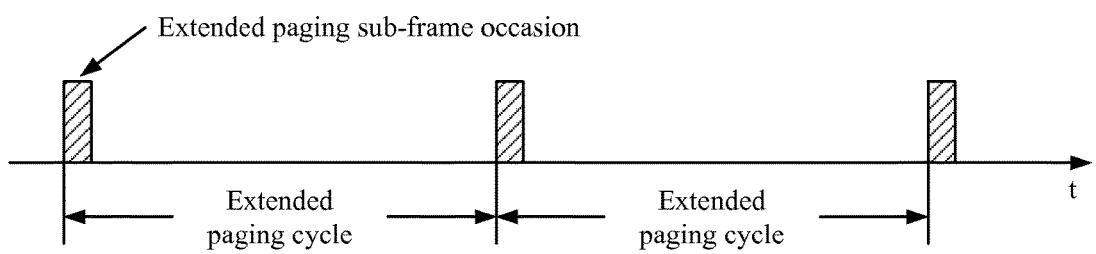
FIG. 6A illustrates a schematic diagram of an extended paging sub-frame occasion according to a first embodiment of the invention.
Figure 6B:
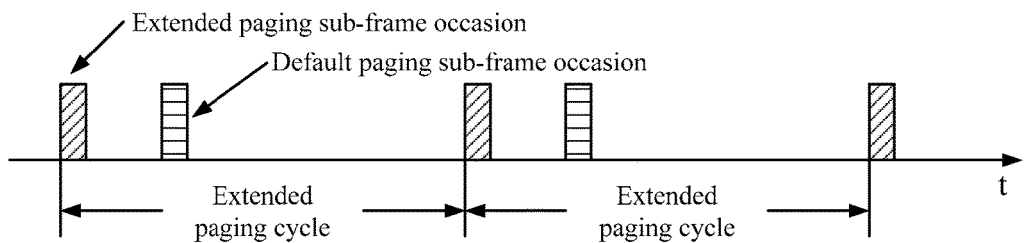
FIG. 6B illustrates a schematic diagram of a default paging sub-frame occasion according to the first embodiment of the invention.

In a first embodiment, the UE receives paging retransmission at a specific paging occasion by default. Taking the specific paging parameter, which is a default paging parameter, as an example, there are a plurality of paging sub-frames of the UE in an extended paging cycle. Particularly:

The UE determines that paging is received in the extended paging cycle (also referred to as an extended paging DRX cycle, which is assumed as 20.48 seconds), as a result of negotiation with a core network; and in this embodiment, if the UE calculates an extended paging occasion from extended paging parameters (including the extended paging cycle, an extended paging density, the number of times for extended paging, etc.) as the sub-frame #2 in the first frame in each extended paging cycle (referred below to as an extended paging sub-frame occasion), as illustrated in FIG. 6A;

The UE is awoken, before each time the extended paging sub-frame occasion arrives, to fetch system information of a cell where it currently resides (i.e., system information transmitted by the base station), and stores default paging parameters carried in the system information (where a default paging cycle of the current cell is 2.56 seconds);

The UE calculate another type of paging sub-frame occasion (i.e., a specific paging occasion) from the default paging parameters, and in this embodiment, the UE calculate a specific paging occasion from the default paging parameters (including a default paging cycle, a default paging density, the number of times for default paging, etc.) as the sub-frame #3 in a frame with SFN=3 in each SFN cycle (referred below to as a default paging sub-frame occasion); and Thereafter the UE is awoken to receive paging at the extended paging sub-frame occasion and a default paging sub-frame occasion in an extended paging cycle, as illustrated in FIG. 6B; and preferably the default paging sub-frame occasion can be located in a next SFN cycle (10.24 seconds) after the extended paging sub-frame occasion, or can be located in any subsequent SFN cycle.

In this embodiment, the UE receives paging twice in an extended paging cycle to thereby improve the reliability of receiving the paging, and shorten a delay in receiving the paging while improving the effect of saving power.

In a second embodiment, the UE enables/disables a function to receive paging retransmission as instructed by the base station, and this embodiment further proposes an enhanced power-saving scheme based upon the first embodiment.

Figure 7A:
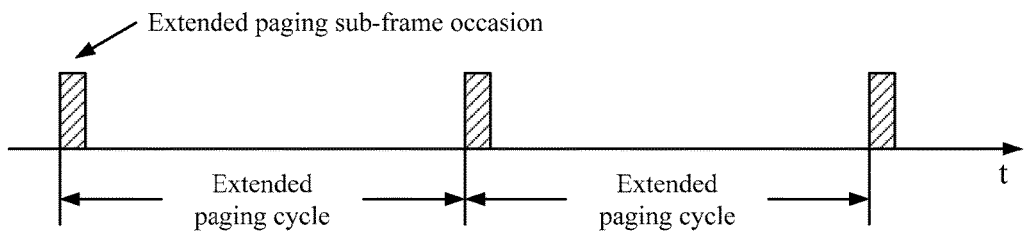
FIG. 7A illustrates a schematic diagram of an extended paging sub-frame occasion according to a second embodiment of the invention.

In the first embodiment, the UE needs to be awoken twice in each extended paging cycle to receive paging. If there is no paging in the extended paging cycle, then the UE may be unnecessarily awoken for the second time, so the base station instructs the UE in system information to or not to be awoken at the default paging sub-frame occasion. If the UE receives the system information of the current cell before the extended paging cycle arrives, where the system information instructs the UE not to be awoken at the default paging sub-frame occasion, then the UE will subsequently receive paging only at the extended paging sub-frame occasion, as illustrated in FIG. 7A.

Figure 7B:
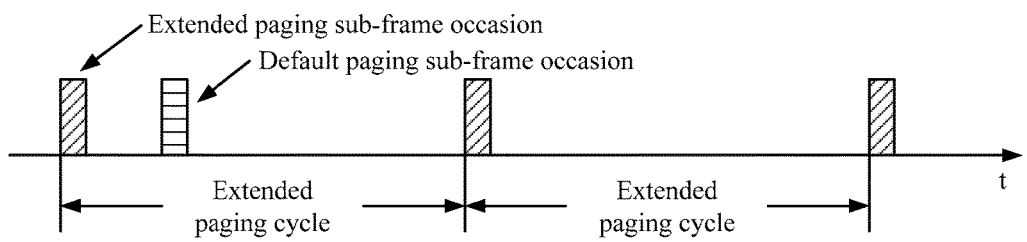
FIG. 7B illustrates a schematic diagram of a default paging sub-frame occasion according to the second embodiment of the invention.

Moreover the base station can alternatively instruct the UE in a paging message at the extended paging sub-frame occasion to or not to be awoken at the default paging sub-frame occasion to receive paging. If the UE is not awoken at the default paging sub-frame occasion by default, then the UE will be awoken in a subsequent default paging sub-frame to receive paging only if the paging message received by the UE at the extended paging sub-frame occasion instructs the UE to be awoken at the default paging sub-frame occasion to receive paging; and the UE will not be awoken in a subsequent default paging sub-frame to receive paging if subsequently the base station further instructs the UE in a paging message at the extended paging sub-frame occasion not to be awoken at the default paging sub-frame occasion to receive paging. As illustrated in FIG. 7B, the UE receives paging at both the extended paging sub-frame occasion and the default paging sub-frame occasion only in an extended paging cycle upon reception of an instruction of the base station.

The effect of power saving can be further improved in this embodiment.

In this embodiment, the base station decides whether to take into account additional paging factors including the length of the extended paging cycle, the current channel quality, the paging density of the current cell, etc. For example, if the paging density of the current cell is low, then the base station can decide to enable a function of paging for a number of times in an extended paging cycle.

In a third embodiment, there are a plurality of paging sub-frames of the UE in an extended paging cycle (based upon paging retransmission parameters).

Figure 8A:
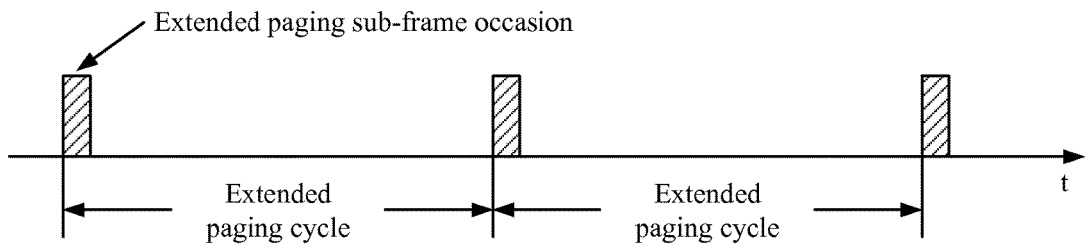
FIG. 8A illustrates a schematic diagram of an extended paging sub-frame occasion according to a third embodiment of the invention.
Figure 8B:
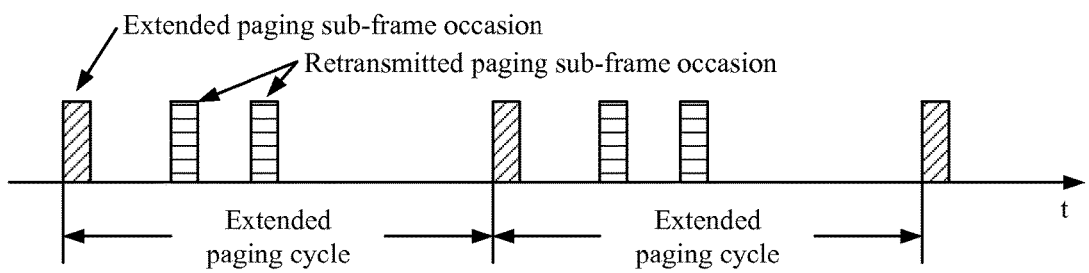
FIG. 8B illustrates a schematic diagram of a paging retransmission sub-frame occasion according to the third embodiment of the invention.

The UE determines that paging is received in the extended paging cycle (e.g., 20.48 seconds), as a result of negotiation with a core network; and in this embodiment, if the UE calculates an extended paging occasion from extended paging parameters as the sub-frame #2 in the first frame in each extended paging cycle (referred below to as an extended paging sub-frame occasion), as illustrated in FIG. 8A;

The UE is awoken, before each time the extended paging sub-frame occasion arrives, to fetch system information of a cell where it currently resides, and stores paging retransmission parameters specially for paging retransmission (for example, there are a paging retransmission cycle of 2.56 seconds, and the number of times for paging retransmission, which is two, of the current cell), where the paging retransmission parameters are different from default paging parameters;

The UE calculate another type of paging sub-frame occasion (i.e., a specific paging occasion) from the paging retransmission parameters, and in this embodiment, the calculated other type of paging sub-frame occasion includes two paging sub-frame occasions, where the first occasion is the sub-frame #3 in a frame with SFN=3 in each SFN cycle, and the second occasion is the sub-frame #3 in a frame with SFN=259 in each SFN cycle (referred below to as a paging retransmission sub-frame occasion); and Thereafter the UE is awoken at the extended paging sub-frame occasion and the two paging retransmission sub-frame occasions in an extended paging cycle to receive paging, as illustrated in FIG. 8B, where the paging retransmission sub-frame occasions can be located in a next SFN cycle (10.24 seconds) after the extended paging sub-frame occasion, or can be located in any subsequent SFN cycle.

In this embodiment, the UE receives paging for three times in an extended paging cycle to thereby improve the reliability of receiving the paging, and shorten a delay in receiving the paging.

The process flows of the methods above can be performed in software program which can be stored in a storage medium, where the stored software program performs the steps of the methods above upon being invoked.

Figure 9:
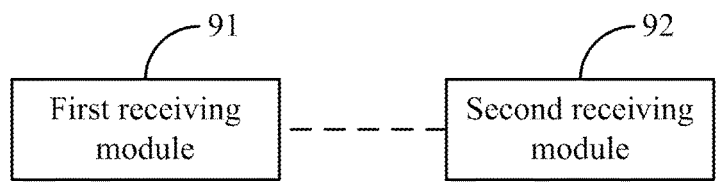
FIG. 9 illustrates a schematic structural diagram of a UE according to an embodiment of the invention.

Following the embodiments above, referring to FIG. 9, an embodiment of the invention provides a UE including:

A first receiving module 91 is configured to receive paging at an extended paging occasion in each extended paging cycle; and A second receiving module 92 is configured to receive paging retransmission at one or more specific paging occasions other than the extended paging occasion in at least one extended paging cycle.

The extended paging cycle in the embodiment of the invention is longer than a traditional DRX cycle, where the traditional DRX cycle includes a default DRX cycle, and a UE specific DRX cycle.

Preferably the extended paging cycle is an integer multiple of the traditional DRX cycle.

In an implementation, the first receiving module 91 configured to determine the extended paging occasion is configured:

To determine a paging frame in which paging is received in each extended paging cycle, according to preset extended paging parameters; and to determine a paging sub-frame in which paging is received in the paging frame, according to the extended paging parameters.

Here the extended paging parameters include at least the extended paging cycle and an extended paging density.

In an implementation, the second receiving module 92 configured to determine the specific paging occasion or occasions is configured:

To determine a paging retransmission frame in which paging retransmission is received in each extended paging cycle, according to specific paging parameters corresponding to paging retransmission; and to determine a paging retransmission sub-frame in which paging retransmission is received in the paging retransmission frame according to the specific paging parameters.

Here the specific paging parameters include at least a specific paging cycle and a specific paging density.

Preferably the specific paging parameters further include the number of times for specific paging.

Furthermore the first receiving module 91 is further configured:

To receive system information transmitted by a base station at any instance of time before the extended paging occasion in the at least one extended paging cycle, and to store the specific paging parameters carried in the system information.

Preferably the second receiving module 92 is configured:

If the extended paging cycle is longer than a System Frame Number (SFN) cycle, to receive paging retransmission at the at least one specific paging occasions in a specified SFN cycle in the extended paging cycle.

Preferably the second receiving module 92 is configured:

If at least two specific paging occasions are determined in each SFN cycle, to receive paging retransmission at a specified specific paging occasion in the at least one extended paging cycle.

Furthermore the first receiving module 91 is further configured:

If first instruction information transmitted by the base station is received in any extended paging cycle, to trigger the second receiving module 92 to receive paging retransmission at the at least one specific paging occasions in the current extended paging cycle and each subsequent extended paging cycle.

Furthermore the first receiving module 91 is further configured:

If second instruction information transmitted by the base station is received in any extended paging cycle, to trigger the second receiving module 92 to stop paging retransmission in a current extended paging cycle and each subsequent extended paging cycle.

Figure 10:
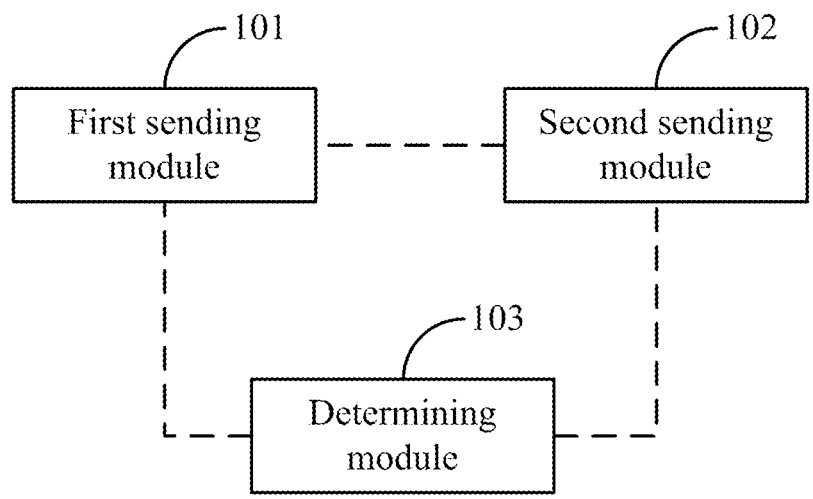
FIG. 10 illustrates a schematic structural diagram of a base station according to an embodiment of the invention.

Following the embodiments above, referring to FIG. 10, an embodiment of the invention provides a base station including:

A first transmitting module 101 is configured to transmit paging at an extended paging occasion in each extended paging cycle; and A second transmitting module 102 is configured to retransmit the paging at one or more specific paging occasions other than the extended paging occasion in at least one extended paging cycle.

The extended paging cycle in the embodiment of the invention is longer than a traditional DRX cycle, where the traditional DRX cycle includes a default DRX cycle, and a UE specific DRX cycle.

Preferably the extended paging cycle is an integer multiple of the traditional DRX cycle.

In an implementation, the first transmitting module 101 configured to determine the extended paging occasion is configured:

To determine a paging frame in which paging is transmit in each extended paging cycle, according to preset extended paging parameters; and to determine a paging sub-frame in which paging is transmitted in the paging frame, according to the extended paging parameters.

Here the extended paging parameters include at least the extended paging cycle and an extended paging density.

Preferably the extended paging parameters further include the number of times for extended paging.

Furthermore the first sending module 101 is further configured:

To determine specific paging parameters for paging retransmission, and to notify a UE of the specific paging parameters in system information.

Here the specific paging parameters include at least a specific paging cycle and a specific paging density.

Preferably the specific paging parameters further include the number of times for specific paging.

In an implementation, the second transmitting module 102 configured to determine the specific paging occasion or occasions is configured:

To determine a paging retransmission frame in which the paging is retransmitted in each extended paging cycle, according to the specific paging parameters; and to determine a paging retransmission sub-frame in which the paging is retransmitted in the paging retransmission frame, according to the specific paging parameters.

Preferably the second transmitting module 102 is configured:

If the extended paging cycle is longer than a System Frame Number (SFN) cycle, to retransmit the paging at the at least one specific paging occasion in a specified SFN cycle in the extended paging cycle.

Preferably the second transmitting module 102 is configured:

If at least two specific paging occasions are determined in each SFN cycle, to retransmit the paging at a specified specific paging occasion in the at least one extended paging cycle.

Preferably the base station further includes:

A determining module 103 is configured to determine whether to retransmit the paging, according to a preset determination criterion; and If it is determined that the paging needs to be retransmitted, to trigger the first transmitting module 101 to transmit first instruction information to the UE in the extended paging cycle, and to trigger the second transmitting module 102 to retransmit the paging at the at least one specific paging occasion;

Here the first instruction information instructs the UE to receive paging retransmission at the at least one specific paging occasion in a current extended paging cycle and each subsequent extended paging cycle.

Preferably if the determining module 103 determines that no paging needs to be retransmitted, then the determining module 103 triggers the first transmitting module 101 to transmit second instruction information to the UE in the extended paging cycle, and to trigger the second transmitting module 102 to stop paging retransmission at the at least one specific paging occasion;

Here the second instruction information instructs the UE to stop paging retransmission from being received in a current extended paging cycle and each subsequent extended paging cycle.

In an implementation, the preset determination criterion includes one or more of criterions:

Whether to retransmit the paging is determined according to the extended paging cycle;

Whether to retransmit the paging is determined according to a current channel quality; and Whether to retransmit the paging is determined according to a paging density of a current cell.

In an implementation, the base station is an eNB in an LTE system; and the base station is an RNC or a Node B in a UMTS system.

Figure 11:
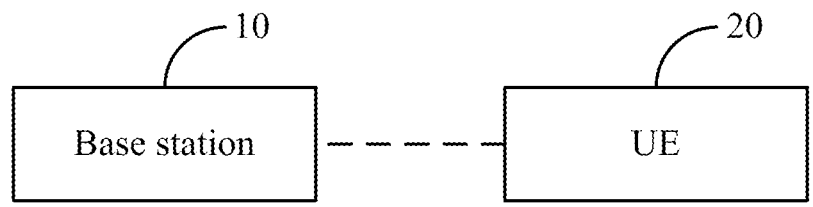
FIG. 11 illustrates a schematic structural diagram of a communication system according to an embodiment of the invention.

Further to the embodiments above, referring to FIG. 11, an embodiment of the invention provides a communication system including:

A base station 10 is configured to transmit paging at an extended paging occasion in each extended paging cycle; and to retransmit the paging at one or more specific paging occasions other than the extended paging occasion in at least one extended paging cycle; and A UE 20 is configured to receive the paging at the extended paging occasion in each extended paging cycle; and to receive paging retransmission at the at least one specific paging occasion other than the extended paging occasion in the at least one extended paging cycle.

The extended paging cycle in the embodiment of the invention is longer than a traditional DRX cycle, where the traditional DRX cycle includes a default DRX cycle, and a UE specific DRX cycle.

Preferably the extended paging cycle is an integer multiple of the traditional DRX cycle.

Figure 12:
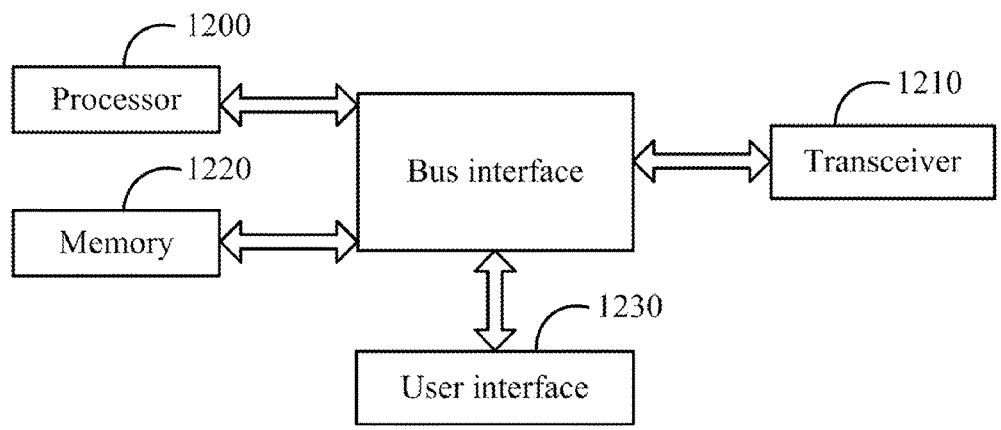
FIG. 12 illustrates a schematic structural diagram of another UE according to an embodiment of the invention.

Following the embodiments above, referring to FIG. 12, an embodiment of the invention provides another UE including:

A processor 1200 is configured to receive the paging at an extended paging occasion in each extended paging cycle through a transceiver 1210; and to receive paging retransmission at one or more specific paging occasions other than the extended paging occasion in at least one extended paging cycle through the transceiver 1210; and The transceiver 1210 is configured to be controlled by the processor 1200 to receive and transmit data.

The extended paging cycle in the embodiment of the invention is longer than a traditional DRX cycle, where the traditional DRX cycle includes a default DRX cycle, and a UE specific DRX cycle.

Preferably the extended paging cycle is an integer multiple of the traditional DRX cycle.

In an implementation, the processor 1200 configured to determine the extended paging occasion is configured:

To determine a paging frame in which paging is received in each extended paging cycle, according to preset extended paging parameters; and to determine a paging sub-frame in which paging is received in the paging frame, according to the extended paging parameters.

Here the extended paging parameters include at least the extended paging cycle and an extended paging density.

In an implementation, the processor 1200 configured to determine the specific paging occasion or occasions is configured:

To determine a paging retransmission frame in which paging retransmission is received in each extended paging cycle, according to specific paging parameters corresponding to paging retransmission; and to determine a paging retransmission sub-frame in which paging retransmission is received in the paging retransmission frame according to the specific paging parameters.

Here the specific paging parameters include at least a specific paging cycle and a specific paging density.

Preferably the specific paging parameters further include the number of times for specific paging.

Furthermore the processor 1200 is further configured:

To receive system information transmitted by a base station at any instance of time before the extended paging occasion in the at least one extended paging cycle, and to store the specific paging parameters carried in the system information.

Preferably the processor 1200 is configured:

If the extended paging cycle is longer than a System Frame Number (SFN) cycle, to receive paging retransmission at the at least one specific paging occasions in a specified SFN cycle in the extended paging cycle.

Preferably the processor 1200 is configured:

If at least two specific paging occasions are determined in each SFN cycle, to receive paging retransmission at a specified specific paging occasion in the at least one extended paging cycle.

Furthermore the processor 1200 is further configured:

If first instruction information transmitted by the base station is received in any extended paging cycle, to trigger the second receiving module 92 to receive paging retransmission at the at least one specific paging occasion in a current extended paging cycle and each subsequent extended paging cycle.

Furthermore the processor 1200 is further configured:

If second instruction information transmitted by the base station is received in any extended paging cycle, to trigger the second receiving module 92 to stop paging retransmission from being received in the current extended paging cycle and each subsequent extended paging cycle.

Here in FIG. 12, a bus architecture can include any number of interconnection buses and bridges which are particularly configured to link various circuits together including one or more processor represented by the processor 1200, and a memory represented by a memory 1220. The bus architecture can link various other circuits together, e.g., peripheral devices, a manostat, a power management circuit, etc., all of which are well known in the art, so a repeated description thereof will be omitted in this context. A bus interface provides an interface. The transceiver 1210 can include a plurality of elements including a transmitter and a receiver configured to provide elements communicating with other various apparatuses over a transmission medium. For different UEs, a user interface 1230 can also be an interface via which needed internal and external devices can be connected, where the connected devices include but will not be limited to a keypad, a display, a speaker, a microphone, a joystick, etc.

The processor 1200 is responsible of managing the bus architecture and of normal processes, and the memory 1220 can store data used by the processor 1200 in operation.

Figure 13:
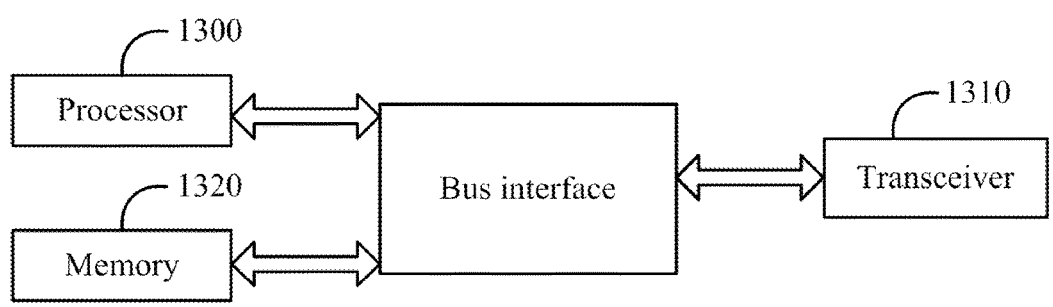
FIG. 13 illustrates a schematic structural diagram of another base station according to an embodiment of the invention.

Following the embodiments above, referring to FIG. 13, an embodiment of the invention provides another base station including:

A processor 1300 is configured to transmit paging at an extended paging occasion in each extended paging cycle through a transceiver 1310; and to retransmit the paging at one or more specific paging occasions other than the extended paging occasion in at least one extended paging cycle through the transceiver 1310; and The transceiver 1310 is controlled by the processor 1300 to receive and transmit data.

The extended paging cycle in the embodiment of the invention is longer than a traditional DRX cycle, where the traditional DRX cycle includes a default DRX cycle, and a UE specific DRX cycle.

Preferably the extended paging cycle is an integer multiple of the traditional DRX cycle.

In an implementation, the processor 1300 configured to determine the extended paging occasion is configured:

To determine a paging frame in which paging is transmitted in each extended paging cycle, according to preset extended paging parameters; and to determine a paging sub-frame in which paging is sent in the paging frame, according to the extended paging parameters.

Here the extended paging parameters include at least the extended paging cycle and an extended paging density.

Preferably the extended paging parameters further include the number of times for extended paging.

Furthermore the processor 1300 is further configured:

To determine specific paging parameters for paging retransmission, and to notify a UE of the specific paging parameters in system information.

Here the specific paging parameters include at least a specific paging cycle and a specific paging density.

Preferably the extended paging parameters further include the number of times for specific paging.

In an implementation, the processor 1300 configured to determine the specific paging occasion or occasions is configured:

To determine a paging retransmission frame in which the paging is retransmitted in each extended paging cycle, according to the specific paging parameters; and to determine a paging retransmission sub-frame in which the paging is retransmitted in the paging retransmission frame, according to the specific paging parameters.

Preferably the processor 1300 is configured:

If the extended paging cycle is longer than a System Frame Number (SFN) cycle, to send paging retransmission at the at least one specific paging occasion in a specified SFN cycle in the extended paging cycle.

Preferably the processor 1300 is configured:

If at least two specific paging occasions are determined in each SFN cycle, to transmit paging retransmission at a specified specific paging occasion in the at least one extended paging cycle.

Preferably the processor 1300 is further configured to determine whether to retransmit the paging, according to a preset determination criterion; and If it is determined that the paging needs to be retransmitted, to transmit first instruction information to the UE in the extended paging cycle, and to retransmit the paging at the at least one specific paging occasions;

Here the first instruction information instructs the UE to receive paging retransmission at the at least one specific paging occasion in the current extended paging cycle and each subsequent extended paging cycle.

Preferably the processor 1300 is further configured:

If it is determined that no paging needs to be retransmitted, to transmit second instruction information to the UE in the extended paging cycle, and to stop paging retransmission at the at least one specific paging occasion;

Here the second instruction information instructs the UE to stop paging retransmission from being received in a current extended paging cycle and each subsequent extended paging cycle.

In an implementation, the preset determination criterion includes one or more of criterions:

Whether to retransmit the paging is determined according to the extended paging cycle;

Whether to retransmit the paging is determined according to a current channel quality; and Whether to retransmit the paging is determined according to a paging density of a current cell.

In an implementation, the base station is an eNB in an LTE system; and the base station is an RNC or a Node B in a UMTS system.

Here in FIG. 13, a bus architecture can include any number of interconnection buses and bridges which are particularly configured to link various circuits together including one or more processor represented by the processor 1300, and a memory represented by a memory 1320. The bus architecture can link various other circuits together, e.g., peripheral devices, a manostat, a power management circuit, etc., all of which are well known in the art, so a repeated description thereof will be omitted in this context. A bus interface provides an interface. The transceiver 1310 can include a plurality of elements including a transmitter and a receiver configured to provide elements communicating with other various apparatuses over a transmission medium. The processor 1300 is responsible of managing the bus architecture and of normal processes, and the memory 1320 can store data used by the processor 1300 in operation.

The processor 1300 is responsible of managing the bus architecture and of normal processes, and the memory 1320 can store data used by the processor 1300 in operation.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A paging method of a user equipment (UE), comprising:

receiving, by the UE, a paging message at an extended paging occasion in each extended paging cycle; and receiving, by the UE, a paging retransmission message at one or more specific paging occasions other than the extended paging occasion in at least one extended paging cycle, so that the UE receives a message about paging at least twice in at least one extended paging cycle.

2. The method according to claim 1, wherein the method further comprises:

determining, by the UE, that a paging message is received in the extended paging cycle, as a result of negotiation with a core network device;

wherein the core network device is a Mobility Management Entity (MME) or a Serving General Packet Radio System (GPRS) Support Node (SGSN).

3. The method according to claim 1, wherein determining, by the UE, the extended paging occasion comprises:
    determining, by the UE, a paging frame in which a paging message is received in each extended paging cycle, according to preset extended paging parameters; and
    determining, by the UE, a paging sub-frame in which a paging message is received in the paging frame, according to the extended paging parameters;
    wherein the extended paging parameters comprise at least the extended paging cycle and an extended paging density.

4. The method according to claim 1, wherein determining, by the UE, the specific paging occasion or occasions comprises:
    determining, by the UE, a paging retransmission frame in which a paging retransmission message is received in each extended paging cycle, according to specific paging parameters corresponding to the paging retransmission message;
    determining, by the UE, a paging retransmission sub-frame in which a paging retransmission message is received in the paging retransmission frame according to the specific paging parameters; and
    receiving, by the UE, system information transmitted by a base station at any instance of time before the extended paging occasion in the at least one extended paging cycle, and storing the specific paging parameters carried in the system information;
    wherein the specific paging parameters comprise a specific paging cycle and a specific paging density, or the specific paging parameters comprise a specific paging cycle, a specific paging density, and the number of times for specific paging;
    wherein the specific paging parameters are default paging parameters defined in the 3GPP protocol, or newly added paging retransmission parameters for only paging retransmission message.

5. The method according to claim 1, wherein if the extended paging cycle is longer than a System Frame Number (SFN) cycle, then:
    the UE receives a paging retransmission message at the at least one specific paging occasion in a specified SFN cycle in the extended paging cycle.

6. The method according to claim 1, wherein:
    if the UE receives first instruction information transmitted by a base station in any extended paging cycle, then the UE receives a paging retransmission message at the at least one specific paging occasion in the current extended paging cycle and each subsequent extended paging cycle; or
    if the UE receives second instruction information transmitted by the base station in any extended paging cycle, then the UE stops receiving a paging retransmission message in the current extended paging cycle and each subsequent extended paging cycle.

7. A user equipment (UE), comprising:
    a processor having an improvement;
    wherein the improvement comprises:
    receiving a paging message at an extended paging occasion in each extended paging cycle through a transceiver; and receiving a paging retransmission message at one or more specific paging occasions other than the extended paging occasion in at least one extended paging cycle through the transceiver, so that the UE receives a message about paging at least twice in at least one extended paging cycle; and
    the transceiver being controlled by the processor to receive and transmit data.

8. The UE according to claim 7, wherein the processor comprises a further improvement for determining the extended paging occasion;
    wherein the further improvement comprises:
    determining a paging frame in which a paging message is received in each extended paging cycle, according to preset extended paging parameters; and determining a paging sub-frame in which a paging message is received in the paging frame, according to the extended paging parameters;
    wherein the extended paging parameters comprise at least the extended paging cycle and an extended paging density.

9. The UE according to claim 7, wherein the processor comprises a further improvement for determining the specific paging occasion or occasions;
    wherein the further improvement comprises:
    determining a paging retransmission frame in which a paging retransmission message is received in each extended paging cycle, according to specific paging parameters corresponding to the paging retransmission message; and determining a paging retransmission sub-frame in which a paging retransmission message is received in the paging retransmission frame according to the specific paging parameters;
    wherein the specific paging parameters comprise at least a specific paging cycle and a specific paging density;
    wherein the further improvement further comprises:
    receiving system information transmitted by a base station at any instance of time before the extended paging occasion in the at least one extended paging cycle, and storing the specific paging parameters carried in the system information.

10. The UE according to claim 7, wherein the processor comprises a further improvement;
    wherein the further improvement comprises:
    if first instruction information transmitted by a base station is received in any extended paging cycle, receiving a paging retransmission message at the at least one specific paging occasion in a current extended paging cycle and each subsequent extended paging cycle; and
    if second instruction information transmitted by the base station is received in any extended paging cycle, stopping receiving a paging retransmission message in the current extended paging cycle and each subsequent extended paging cycle.

* * * * *